July 23, 1968 G. CAFICI 3,394,276

ASYNCHRONOUS ELECTRIC MOTOR

Filed May 27, 1965 8 Sheets-Sheet 1

INVENTOR.
GIUSEPPE CAFICI
BY Steinberg & Blake
attys

INVENTOR.
GIUSEPPE CAFICI

INVENTOR.
GIUSEPPE CAFICI

July 23, 1968

G. CAFICI 3,394,276

ASYNCHRONOUS ELECTRIC MOTOR

Filed May 27, 1965

INVENTOR.
GIUSEPPE CAFICI
BY Steinberg & Blake
attys

United States Patent Office 3,394,276
Patented July 23, 1968

3,394,276
ASYNCHRONOUS ELECTRIC MOTOR
Giuseppe Cafici, Via Comune Antico 25, Milan, Italy
Filed May 27, 1965, Ser. No. 459,205
Claims priority, application Italy, Jan. 28, 1965,
Patents 749,625, 749,626
9 Claims. (Cl. 310—67)

ABSTRACT OF THE DISCLOSURE

An asynchronous electric motor to be used, for example, for rotating fan blades. The motor has a toroid coil inductor and a short-circuited or squirrel cage rotor which is at least partly surrounded by this inductor. A rotary shaft carries the rotor and a frame supports this shaft for rotary movement. A cantilever support means is provided for supporting the inductor on the frame so that in this way the inductor is secured in cantilever fashion to the frame. As a result of this construction a larger output is achieved, as compared to conventional motors of the same size, and in addition it is possible to maintain the axial dimensions of the motor exceedingly small so that the motor can advantageously be used in those applications where the radial dimensions of the motor can be relatively large while the axial dimensions thereof are required to be exceedingly small.

This invention relates to an asynchronous elecertic motor, and to a few applications of such motor in the field of axial and centrifugal fans.

The main purpose of this invention consists in the provisions of a novel asynchronous motor, having a toroidally wound inductor, and a short-circuited rotor, and having the advantage of a very small axial size as compared to conventional asynchronous motors.

Another purpose of this invention consists in the provision of an asynchronous motor having a toroidally wound inductor, and a short circuited rotor, and provided with means to have the inductor cantilever-supported, whereby an additional decrease in the axial size thereof can be attained.

A further purpose of the invention consists in the provision of a novel fan, embodying an asynchronous motor having a toroid coil inductor and a short-circuited rotor, and wherein the blading is supported by the rotor, while the whole motor may be situated within the hub of such fan.

Another purpose of this invention consists in the provision of an asynchronous motor having a toroidally wound inductor, and a short circuited rotor, and wherein the inductor is surrounded on three sides by the rotor, thereby allowing the utilization of stray fluxes.

A further purpose of this invention consists in the provision of an axial or centrifugal fan, powered by an asynchronous electric motor having a toroidally wound inductor, and a short-circuited rotor by which three sides of same inductor are surrounded, with the fan blading supported on one of such sides.

According to the invention, a preferably single-phase (or di-phase) asynchronous motor is provided, having a toroidally wound inductor, and a short-circuited (preferably a squirrel-cage) rotor, and wherein the inductor is cantilever-supported by a generally stationary frame.

According to a particular aspect of the invention, the stator, i.e. the inductor, is cantilever supported by such frame, by means of tie rods, that are inserted into holes extending crosswise through the lamination pack of the inductor.

According to another aspect of the invention, the inner and outer cylindrical peripheries, as well as one of the end faces of the inductor are faced by the rotor, this end face being opposite to that where the tie rods, for cantilever support of the inductor, are connected.

According to a novel aspect of the invention, the electric fan is comprisive of a row of spiral shaped blades, fitted on a ring, that in turn is secured to a metal cap rigidly secured to the rotor, and by which two sides of the outer surfaces of inductor winding are surrounded, this cap acting as a rotor.

According to a further aspect of the invention, the electric fan is comprisive of a row of blades, supported by the metal cap, acting also as a rotor, and by which one of sides, as well as the outer cylindrical surface of the inductor are surrounded, these blades being inclined with respect to rotor spokes.

The invention will be better understood from a consideration of the following, detailed description, taken with the accompanying drawing, wherein some embodiments thereof are shown, both description and drawings being given only as a not restrictive example. In the drawings.

Figure 1:
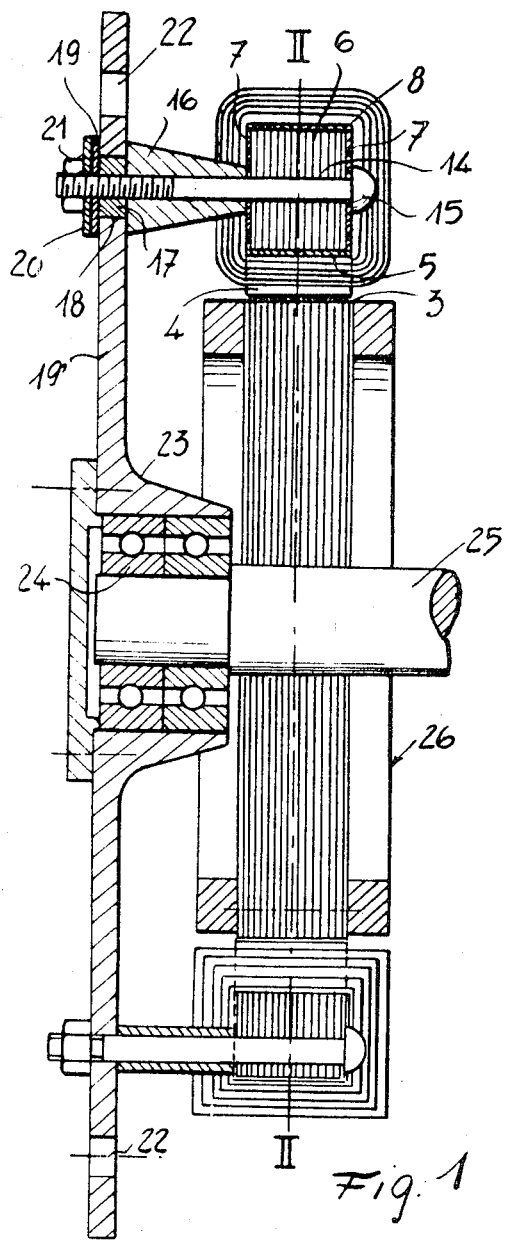
FIG. 1 is a diagrammatic axial section of a toroidally wound asynchronous motor.
Figure 2:
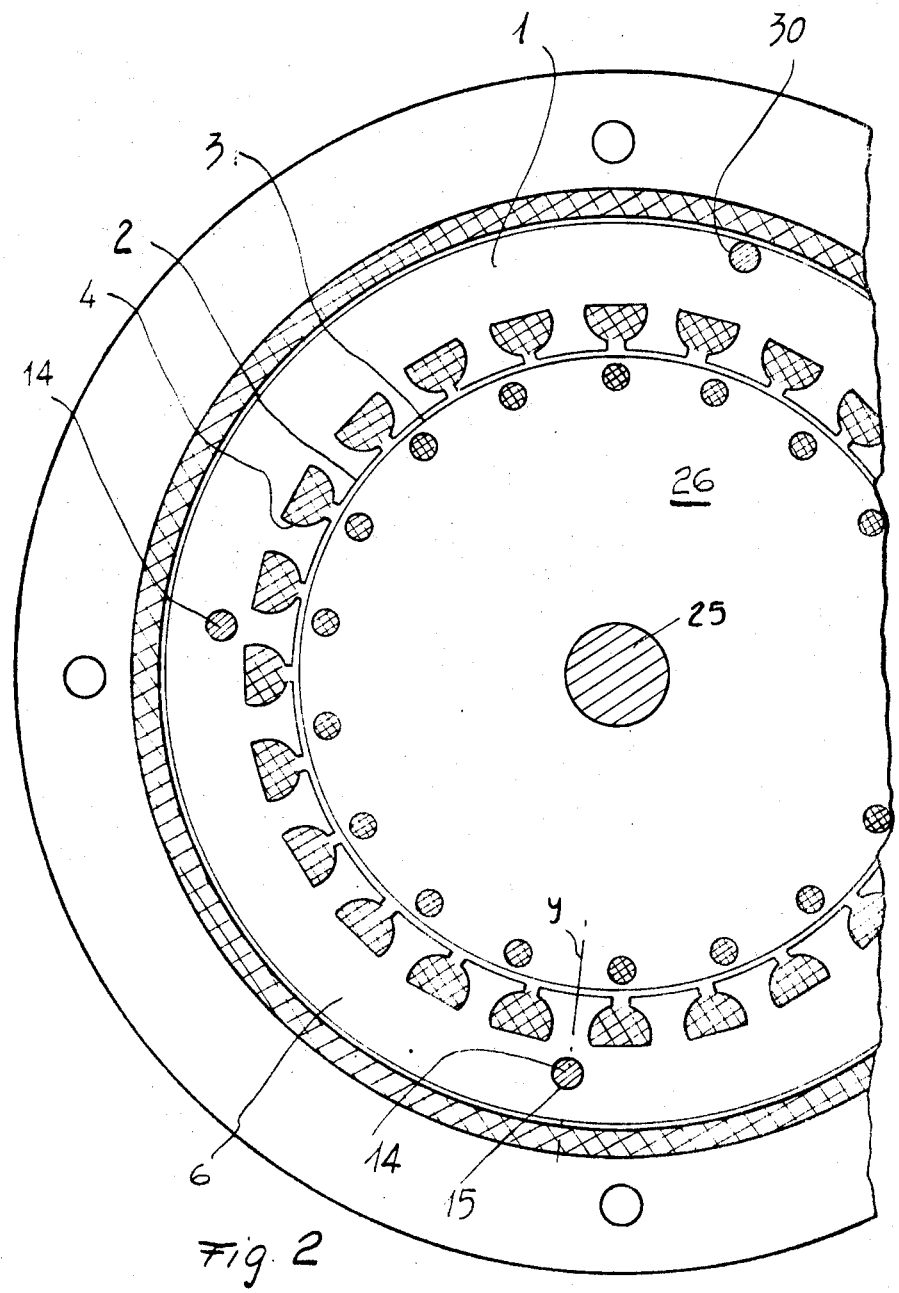
FIG. 2 is a partial section of same motor, taken on the line II—II of FIG. 1.
Figure 3:
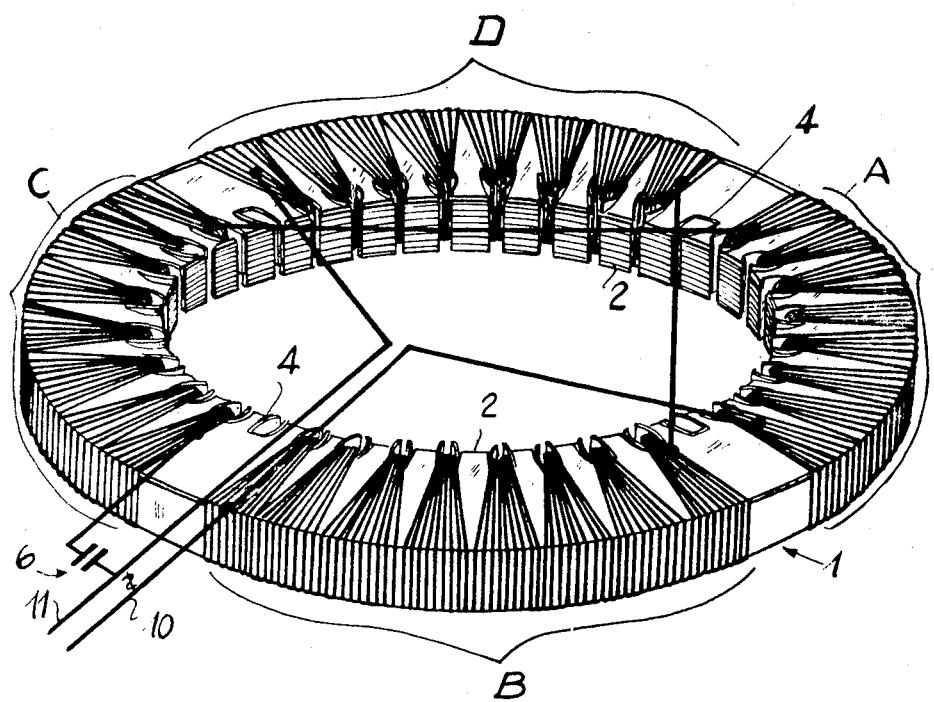
FIG. 3 is a perspective view of the inductor only, the conductors by which the different winding sections are connected with one another being diagrammatically shown.

Referring now to FIGS. 1 to 3 inclusive, the inductor, that is indicated in its entirety by the numeral 1, has an adequate number of notches 4, having any suitable section, formed at its inner periphery, directed toward the air-gap 3 and lined with an electrically insulating material 5. The inductor 1 consists, as usually, of laminations in the form of a packet of magnetic stampings. This packet, whose stampings can be clamped with one another by mechanical fasteners as is well known, is electrically insulated all along its exterior, except for its inner periphery 2, directed toward the air-gap 3. In more detail, rings 7, of pasteboard or other insulating material, are applied against the packet and faces, while a band or ring 8, also of pasteboard or other insulating material, is applied on the outer periphery of same packet.

A ring winding is wound on the packet of magnetic stampings 6 of the inductor 1, thus formed and insulated (see FIG. 3), i.e. a winding whose conductors, laid in the slots 4, are toroidally wound round the inductor core to form a toroid coil.

A ring-wound inductor in the form of a toroid coil is shown in the FIG 3, wherein the different electrical connections between the lead-in conductors and the various sections of winding, are pointed out. In particular, it is assumed that the inductor is a component of a single-two phase induction motor, wherein a section of winding is fed from the single-phase source through an impedance 6″, consisting of a condenser. The inductor winding is subdivided into four sections A, B, C, D, extending each over substantially 90 deg. of ring contour. A space equal to the width of a slot is left free between adjoining sections. The ring windings of sections B and D, located opposite with each other, are series connected, and are fed by the conductors 10 and 11, while the windings of sections A and C are series connected both with each other, and with the condenser 6, also connected with the conductors 10 and 11. All this is clearly shown in the FIG. 3.

In the arrangement as shown in the FIG. 3, wherein the inductor winding is subdivided into four sections, between which exposed lengths, extending at least over a slot, are left, such free slots are utilized for having tie rods laid therethrough, in order to have the inductor-cantilever-supported in a manner similar to that shown in the FIGS. 1 and 2, wherein however different through openings are utilized for the tie rods, as described in more detail below.

The ways by which the inductor is cantilever supported will be now described in more detail with reference to FIGS. 1 and 2, wherein, for such cantilever supporting, the tie rods are threaded into through bores that are formed in the lamination pack 6 of the indicator, instead of laying them in slots. More precisely, through bores 14 are formed at four equidistant points of lamination pack 6 (see FIGS. 1 and 2). Such bores may be formed both on the middleline y of a tooth, and in one of the areas of lamination pack that are left free from the ring winding. Tie rods 15, having threaded ends, extend through said bores 14, which may be possibly lined with an electrically insulating material. The portion of the tie rod which protrudes out of lamination pack, extends through a bush 16, made of an insulating material, and formed with a lug 17, that is engaged into a suitable hole 18 of supporting plate 19', which may be made of a metal sheet, or of a casting, or of any other suitable material. An insulating washer 19 and an iron washer 20 are slipped over said tie rod and the whole assembly is finally tightened by means of the nut 21. Thus, the inductor is cantilever connected with the supporting member 19', that may be fastened, e.g. by its holes 22, to any other component, e.g. to a wall or vertical structure. The shaft 25 is laid in bearings 24, that are fitted in a bush 23 carried by the supporting frame 19'. The short-circuited or squirrel cage type rotor 26, of conventional design, is keyed in the usual manner on the shaft 25.

It is thus manifest that the hereinafter stated solutions are also covered by the invention:

(a) Laying of tie rods 15 into the slots (as shown in the FIG. 3) for cantilever supporting the inductor.

(b) The tie rod bores may be formed all along the outer contour of lamination pack 6, as indicated by the reference numeral 30 in the FIG. 2. If such bores have a small gap toward the outside, then the tie rods 15 could be electrically welded to the lamination pack, thus acting as clamping means for the pack, in place of the conventionally used means. When the bores are instead formed with large gaps toward the outside, the tie rods, when formed with lugs at either ends, and shrunk in said bores, will act as a very efficient clamping means for the lamination pack 8.

(c) The use of short-circuited wound rotors, instead of squirrel cage rotors.

The design as shown in the FIGS. 4 and 5, and which will be described hereinafter, allows the utilization of nearly all the stray fluxes of inductor winding.

In said proposed design and shape of the inductor and rotor of a toroidally wound asynchronous motor, the path of active flux extends in both radial directions, i.e., radially toward the inside and toward the outside of the toroid coil inductor and even axially toward both end faces of the inductor, thereby obtaining—by equality of electric and magnetic material—a better output and economy for the asynchronous electric motor, when compared with previous designs.

Figure 4:
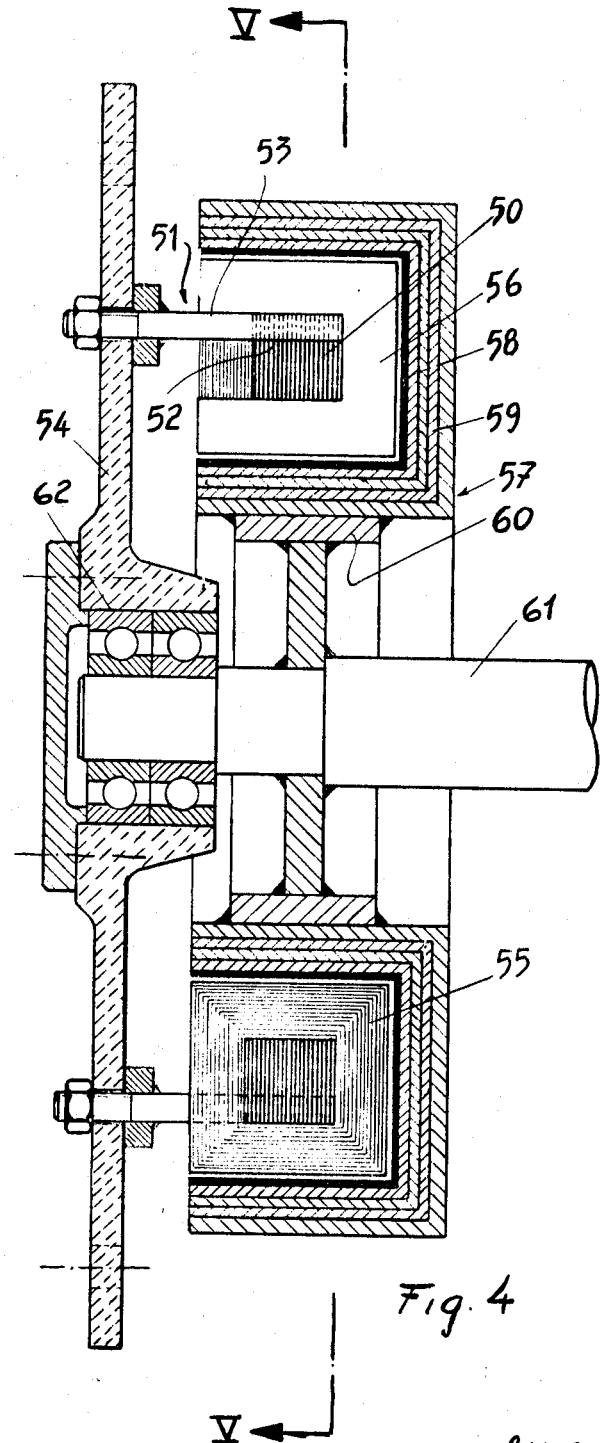
FIG. 4 is an axial section of another embodiment form of a toroidally wound asynchronous motor.
Figure 5:
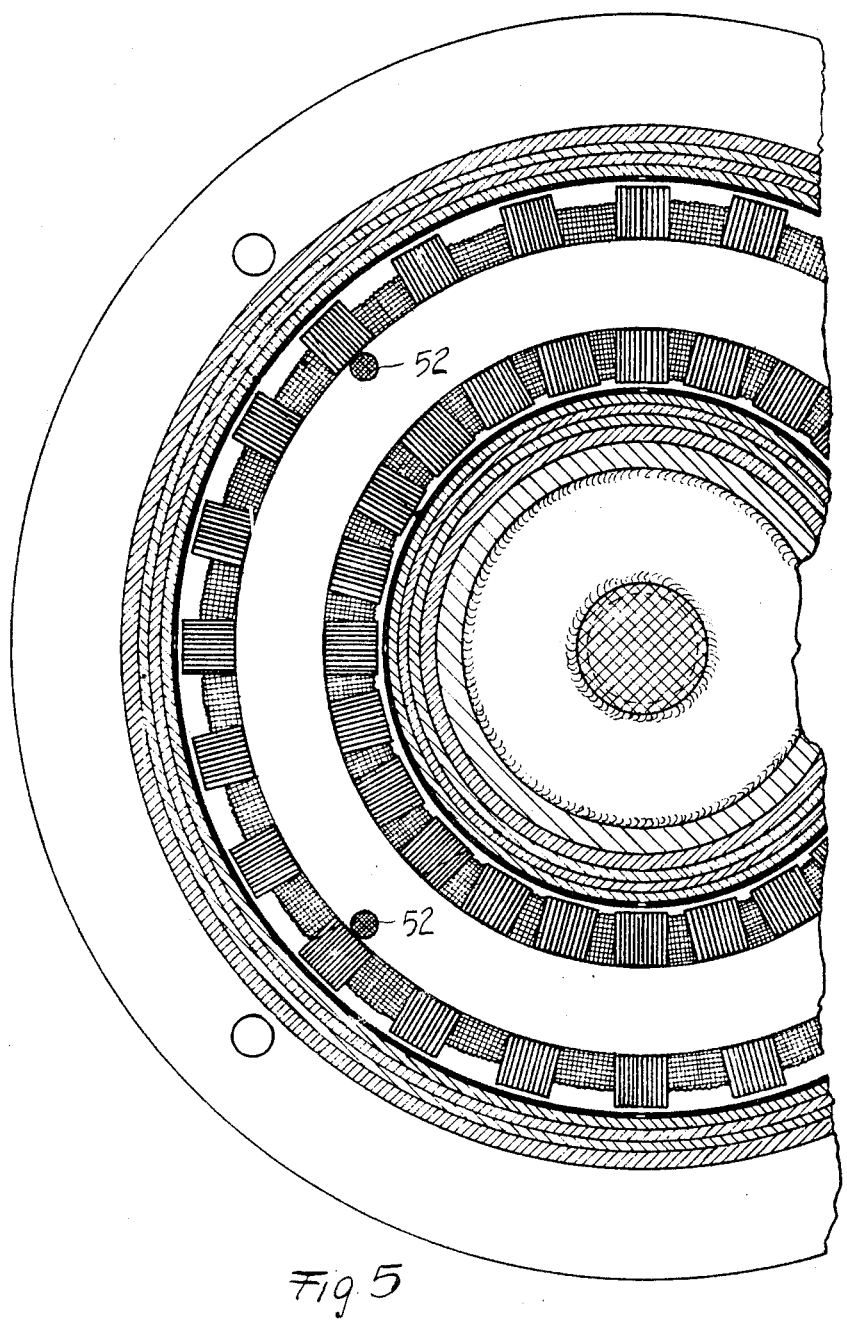
FIG. 5 is a section taken on the line V—V of FIG. 4.

In the design as shown in the FIGS. 4 and 5, the magnetic lamination pack 50 of stator 51, consists of a plurality of magnetic annular stampings, that are connected with one another by any known means, e.g. by welding, as previously stated with reference to preceding embodiment. Said pack 50 is formed with a number of through bores 52, to accommodate tie rods 53 which, after having been secured (e.g. by welding) to the pack, connects the stator with the supporting frame of plate 54. The tie rods 53 project frontally out of one stator end face, by a length greater than the over-all dimensions of coils 55 of toroidal winding as wound on the inductor. Packets 56 of C-shaped magnetic stampings are fitted on the annular pack 50 of magnetic stampings, with the open side of the C directed toward the points wherefrom the clamping tie rods 53 project out of the stator end face.

Said packets are equally spaced from one another, and their number is equal to that of slots with which the inductor is to be formed.

The toroidal winding, as formed by the coils 55, is wound in the spaces left between said packets, and wherein the insulation (not shown) is also fitted.

The magnetic flux, as generated by the above winding, may follow three differently directed paths, e.g. a radial path toward the inside of the annular pack 50, a radial path toward the ouside, and an axial path toward the front end face of the pack, i.e. to the end face opposite to open side of C-shaped packets 56.

The fourth direction of path is not utilized in order to make the assembling of motor more easy, and also to prevent the otherwise unavoidable interference between the revolving rotor, and the clamping tie rods.

The rotor 57 consists of a copper ring 58, having a C-shaped radial section, and acting as armature winding (the packets of magnetic stampings 56 being surrounded, with a very narrow air gap, by said ring) and of a plurality of superposed, C-shaped iron rings 59, the crown of the rotor magnetic circuit being formed by all of such rings, that are welded with one another.

The armature thus formed is inserted on, or welded to a bush or sleeve 60, which is coupled with the driving shaft 61, of the asynchronous motor, which is supported by the bearing 62, which is carried by the supporting plate 54.

The design shown in the FIGS. 4 and 5 may be simplified without prejudice to the advantages of the utilization of stray fluxes for the purpose of producing a torque. Such simplified design is shown in the FIG. 7 of drawing, wherein the motor is embodied in an axial fan.

In such example, both the inductor and the squirrel cage rotor are similar to those of motor as shown in the FIGS. 1 to 3 inclusive. Consequently, all similar or equivalent components are identified, in this example, by the same reference numerals, to which a prime is added.

A metal cap 70 (e.g. of aluminium or copper) facing one of end faces 71, and the outer cylindric surface 72, of the inductor 1', is utilized in this example, to provide utilization of stray fluxes. Such a very simple metal cap actually operates as a second armature, that is parallel connected with the short-circuited or squirred cage rotor 26', and that serves—as stated later on—as a support for the spiral shaped blades 80 of fan.

Said cap 70 is secured, by any suitable, already known means, e.g. by screws or by welding, to one of short-circuiting rings 81 of rotor cage.

Thus, the possibility is obtained to take advantage of stray fluxes by means of this second short-circuiter rotor, having advantageously a very simple design, and that may consist merely of an aluminium sheet pressing.

Figure 6:
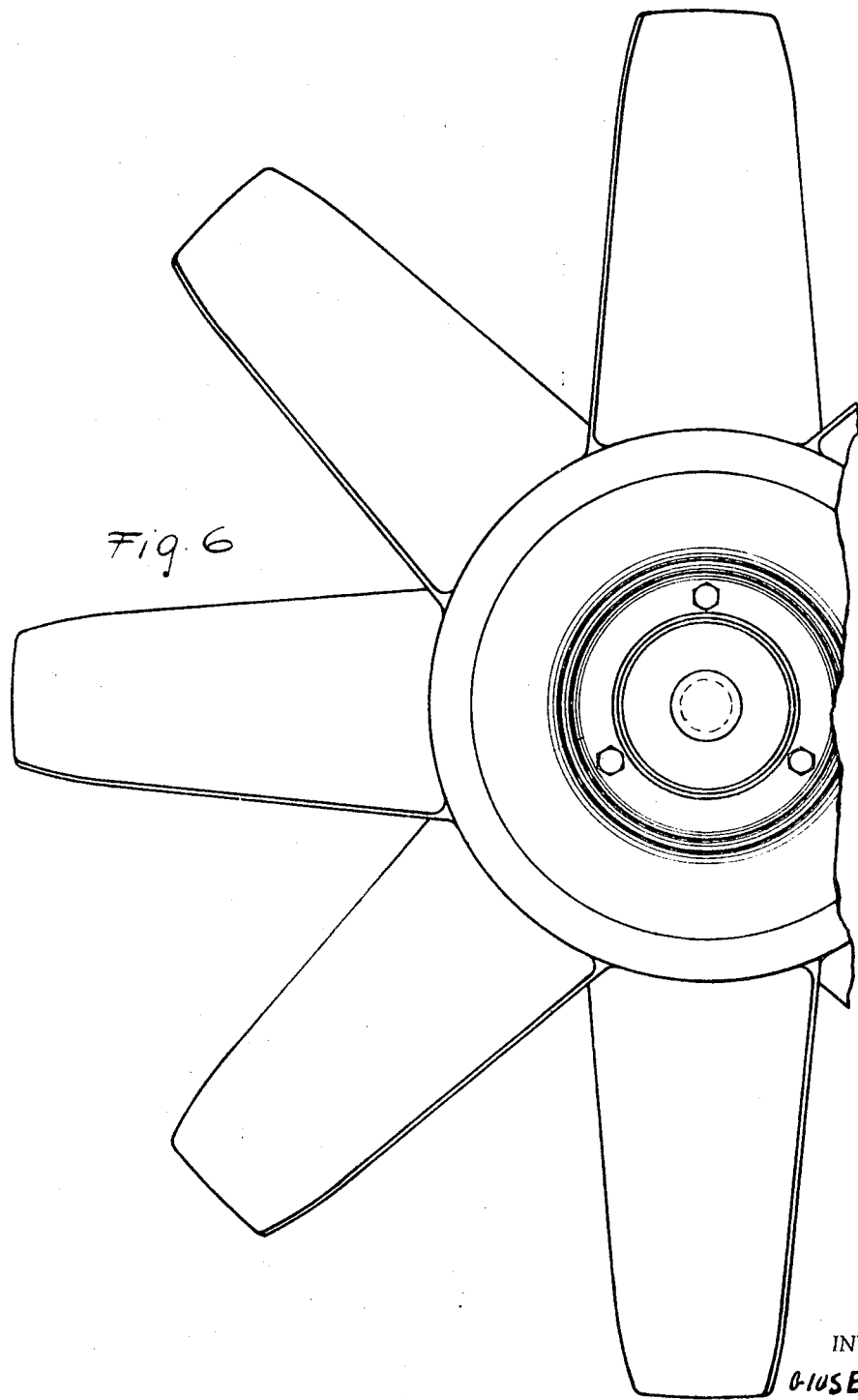
FIG. 6 is a front view of a torodially wound axial fan.
Figure 7:
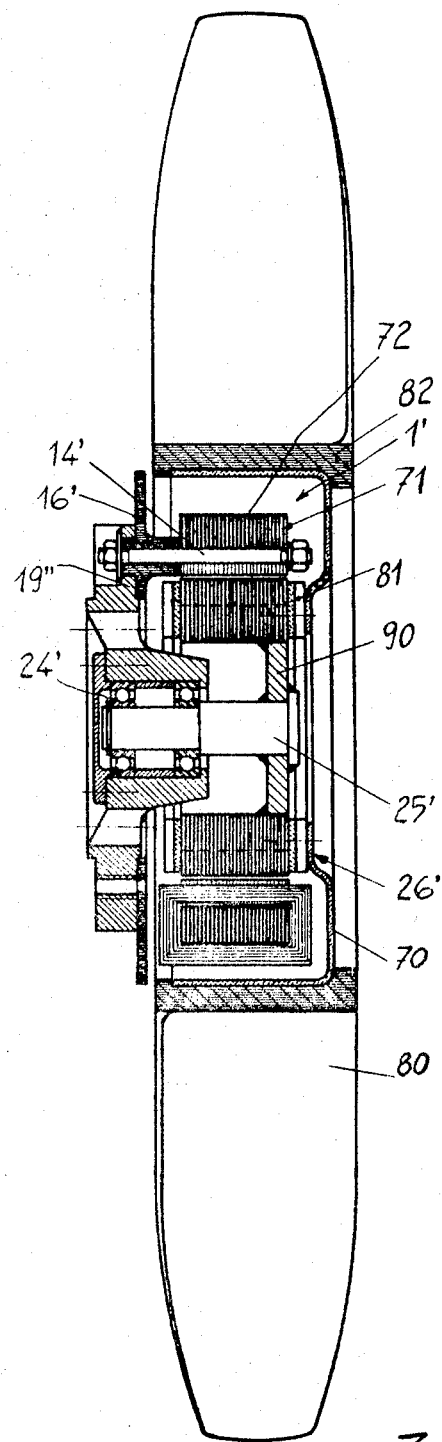
FIG. 7 is an axial section of the fan of FIG. 6.

Fast with same cap is a ring 82, carrying a row of spiral shaped blades 80, as shown in the FIGS. 6 and 7. In particular, both the ring 82 and the blades 80 may be molded in any suitable plastics, and the ring may be slipped on, and secured to the cap by any known means, e.g. by screws, or by having the rear end of ring formed with serrations, that are caused to snap into, and to get engaged with one of cap ends, when the ring is being forced thereover.

Thus, an unusually advantageous spiral fan is obtained, since the otherwise inoperative blading central section is utilized to accommodate the motor, thereby attaining a more efficient, and simultaneously cheaper design. Otherwise stated, a portion of fan, which due to operational and structural reasons cannot be utilized in the conventional fans, is now used to accommodate the motor.

The short-circuited rotor 26' is made of the usual magnetic stamping pack and of the squirrel cage. This pack is welded to a plate 90, that is in turn welded to shaft 25'.

Figure 8:
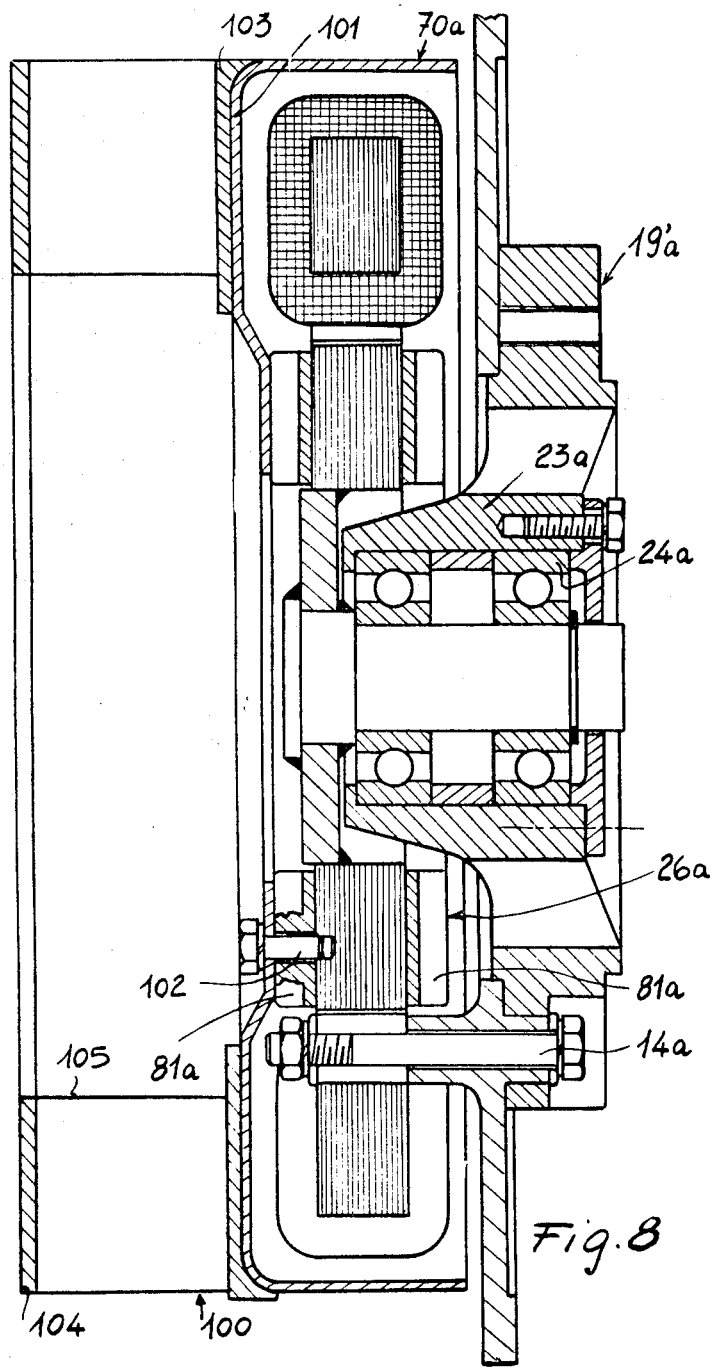
FIG. 8 is a side elevation of a centrifugal fan embodying the toroidally wound asynchronous electric motor.

FIG. 8 shows the application of the motor, as shown in FIG. 7, for the drive of a centrifugal ventilator 100, all similar or equivalent components being indicated by the same reference numerals already utilized in the previous description, made with reference to FIGS. 1, 2, 3 and 6, and to which the letter "*a*" is added.

In such a case, the inner ring 103 of centrifugal fan 100, is secured by the screws 102 to front side 101 of cap 70*a*, acting as auxiliary rotor and by which two sides of the inductor 1*a'* are surrounded, the cap being secured by the screws 102 to one of short-circuiting rings 81*a* of the short-circuited or squirrel-cage rotor 26*a*. A row of inclined blades 105, of the type usually utilized in centrifugal fans, are fitted between said inner ring 103, and the outer ring 104 of fan 100.

A motor having a very small axial size is thus obtained.

The coils, or the inductor winding may be wound by hand, or by a winding machine on the inductor magnetic pack, in the manner as disclosed, e.g., in the Italian Patent No. 622,649.

What I claim is:

1. An asynchronous electric motor, comprising a toroid coil inductor, a short-circuited rotor at least partly surrounded by said inductor, a rotary shaft carrying said rotor, a frame supporting said shaft for rotary movement, and cantilever support means for supporting said inductor on said frame and by which said inductor is cantilever secured to said frame.

2. An asynchronous electric motor according to claim 1, wherein the short-circuited rotor is of squirrel cage type.

3. An asynchronous electric motor, comprising a toroid coil inductor, a short-circuited rotor, a rotary shaft whereon said rotor is fitted, a metal cap fast with said rotor, and by which said inductor is partially surrounded, a frame for supporting said inductor, rotor and shaft, and means by which said inductor is cantilever secured to said frame.

4. An asynchronous electric motor comprising a toroid coil annular inductor having an outer periphery, an inner periphery and two axially opposite end faces, a short circuited rotor, a rotary shaft carrying said rotor, a metal cap facing the outer periphery and one end face of said inductor, and secured to said rotor, a frame for supporting said inductor, rotor and shaft, and means by which said inductor is cantilever secured to said frame.

5. An asynchronous electric motor comprising an annular pack of magnetic stampings having an inner periphery formed with a circumferential row of axial slots, a winding toroidally wound on said annular pack to form a toroid coil therewith, said winding having convolutions parts of which are in said slots, a short-circuited rotor at least partly surrounded by said toroid coil, a rotary shaft carrying said rotor, a frame for supporting said annular pack, rotor and shaft, and tie rods projecting out of said annular pack and cantilever secured to said supporting frame.

6. An asynchronous electric motor comprising an inductor having an annular pack of magnetic stampings, a row of C-shaped packets of magnetic stampings, uniformly spaced round, and radially secured to said annular pack, a winding toroidally wound on said annular pack between said C-shaped packets to form a toroid coil therewith, a short-circuited annular rotor having substantially a C-section and forming an annular channel open at one side, and said inductor being situated in said channel and exposed at only one face at said open side of said rotor, a rotary shaft carrying said annular rotor, a frame for supporting said inductor, rotor and shaft, and means by which said inductor is cantilever connected with said supporting frame.

7. An electric fan comprising a circumferential row of blades, and an asynchronous motor having a toroid coil inductor, a short-circuited rotor, a rotary shaft carrying said rotor, a metal cap secured to said rotor, and by which said inductor is partly surrounded, a frame for supporting said inductor, rotor and shaft, means by which the inductor is cantilever connected with said frame, and said row of blades being carried by said cap.

8. An electric fan according to claim 7, wherein the blades are spiral shaped.

9. An electric fan according to claim 7, wherein the blades are of the centrifugal type.

References Cited

UNITED STATES PATENTS

| | | | |
|---|---|---|---|
| 2,367,079 | 1/1945 | Wiest | 310—180 |
| 2,427,947 | 9/1947 | Koch | 310—67 |
| 2,829,287 | 4/1958 | Font | 310—67 |
| 2,926,838 | 3/1960 | Van Rijn | 310—67 |

MILTON O. HIRSHFIELD, *Primary Examiner.*

L. L. SMITH, *Assistant Examiner.*